United States Patent [19]
Plate et al.

[11] 3,801,409
[45] Apr. 2, 1974

[54] SEALING CUTTING MECHANISM
[76] Inventors: Geerardous G. Plate, Humphreys Crescent; Nicolaas Van Hattem, 1168 Homewood Dr., both of Burlington, Ontario, Canada
[22] Filed: June 19, 1972
[21] Appl. No.: 263,924

Related U.S. Application Data
Division of Ser. No. 888,498, Dec. 29, 1969 Pat. No. 3,673,879.

[52] U.S. Cl. ................................ 156/515, 56/530
[51] Int. Cl. ........................................... B32b 31/02
[58] Field of Search ............ 156/515, 518, 511, 530

[56] References Cited
UNITED STATES PATENTS
| | | | |
|---|---|---|---|
| 3,758,366 | 9/1973 | Ballestrazzi et al. | 156/515 |
| 3,257,256 | 6/1966 | Lehmacher et al. | 156/515 X |
| 3,503,830 | 3/1970 | Schwarzkopf | 156/515 |
| 3,551,259 | 12/1970 | Schwarzkopf | 156/581 |
| 3,650,873 | 3/1972 | Smith et al. | 156/465 |
| 3,663,338 | 5/1972 | Wech | 156/515 |

*Primary Examiner*—Douglas J. Drummond
*Assistant Examiner*—M. G. Wityshyn

[57] ABSTRACT

A sealing-cutting mechanism for use in a bag-making machine for manufacturing bags from thermoplastic material of tubular, flexible stock comprising an elongated knife mounted for vertical reciprocal travel into and out of a mating recess, a sealing bar adapted for vertical reciprocal travel onto a support in proximity to said knife and recess, and a mechanical-hydraulic actuating and controlling mechanism operatively connected to said knife and sealing bar.

3 Claims, 8 Drawing Figures

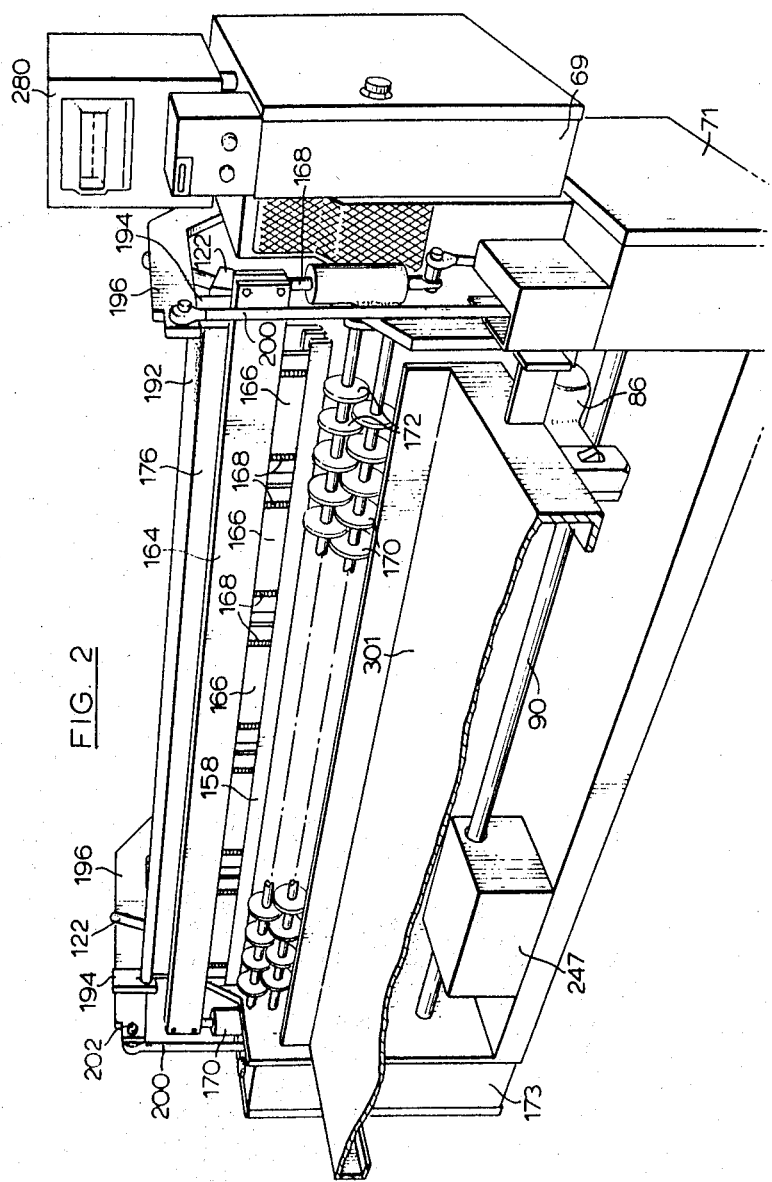

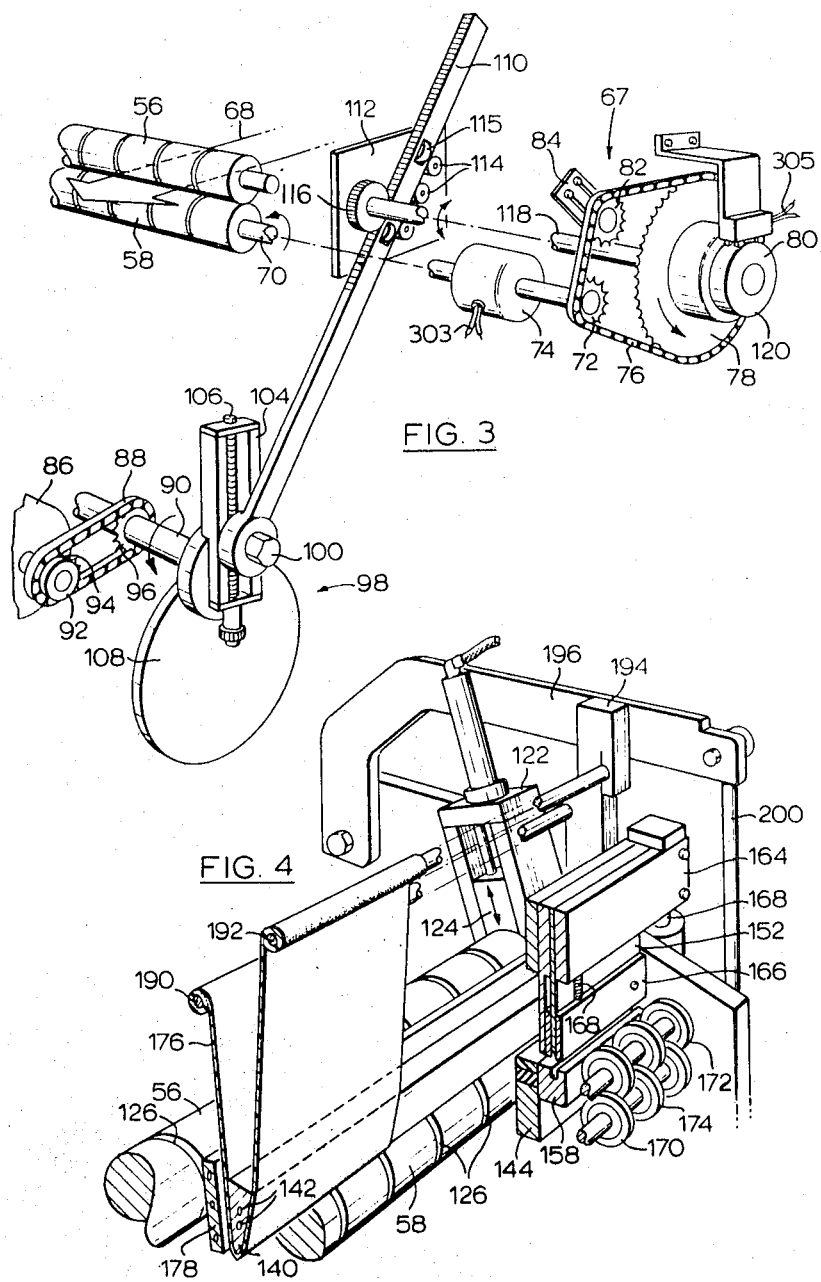

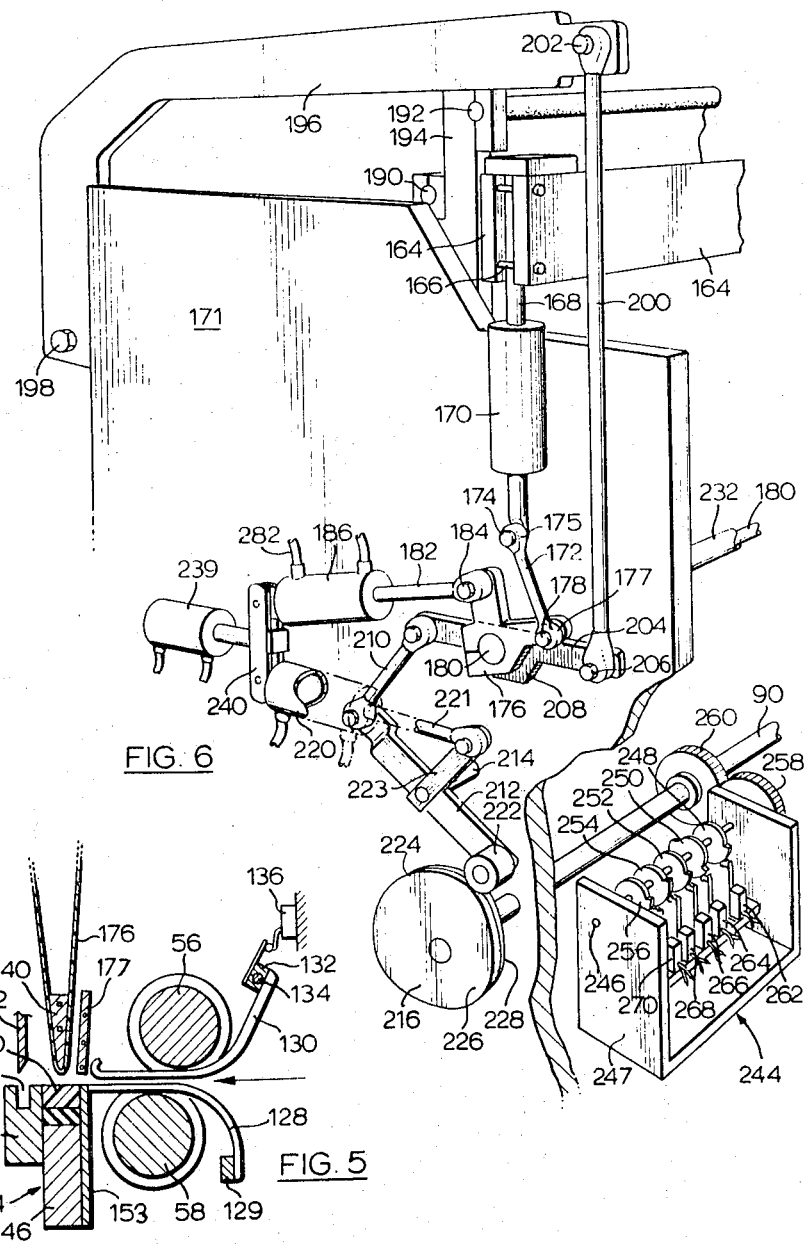

SEALING CUTTING MECHANISM

This is a division of application Ser. No. 888,498 filed Dec. 29, 1969 now U.S. Pat. No. 3,673,879.

BACKGROUND OF THE INVENTION

This invention relates to a bag-making machine and more particularly relates to an improved sealing-cutting mechanism in a machine for fabricating bags from thermoplastic material of tubular, flexible stock.

It is known to form bags from tubular feed stock of thermoplastic material such as polyethylene or polypropylene by heat and pressure sealing together the opposed sides of a flattened tube of said stock to form a bag bottom while substantially concurrently cutting said stock adjacent the seal for severing the preceding bag from the stock. Each newly-formed bag must then be discharged from the bag-making machine and the stock advanced to the desired position for the next sealing-cutting operation.

Serious disadvantages have heretofore been inherent in conventional bag-making machines. Throughput of stock and discharge of newly-formed bags from the machines have been limited by the dwell time required to apply heat and pressure to opposed sides of flattened stock while stationary to achieve a suitable seal and to cut the stock and by the time required to accelerate each newly-formed bag away from the machine to permit advance of the stock for a repeat of the sealing-cutting operation. For example, it is common practice to accelerate the open end of flexible tubular stock from the bag-making machine to a holding position in a conveyor system for the sealing-cutting operation at which time the stock is transversely heat and pressure sealed and the newly-formed bag severed from the stock material for discharge to a stacking bin. This technique results in air being trapped in the bags as they are discharged requiring a complex conveyor system for rapid discharge of finished bags.

STATEMENT OF INVENTION

We have found that this problem can be substantially overcome by sealing the open end of the tubular stock material and first discharging the resulting closed end from the machine. The stock is then severed and the newly-formed bag transported a short distance to a stacking bin by simple stacking wheels while the end of the stock material is concurrently heat-sealed for a repeat of the bag-making cycle.

It is therefore an important object of the present invention to provide a bag-making machine capable of forming bags from a tubular stock of thermoplastic material at a high rate of throughput by the provision of a heat and pressure sealing and cutting mechanism which is quick and reliable in operation requiring a minimum of dwell time and providing an effective and reliable seal.

BRIEF DESCRIPTION OF THE DRAWINGS

Other objects of our invention and the manner in which they can be obtained will become apparent from the following detailed description of the drawings, in which:

FIG. 2 is a perspective view of the discharge end of the machine shown schematically in FIG. 1;

FIG. 3 is an exploded perspective view, partly cut away, of the drive mechanism of the machine;

FIG. 4 is a perspective view, partly cut away, of the heat and pressure sealing, cutting and discharge mechanism of the machine;

FIG. 5 is a sectional view of the sealing-cutting and jam-control mechanisms of our invention;

FIG. 6 is a perspective view of the control system and actuating mechanisms of the machine;

Figure 1:
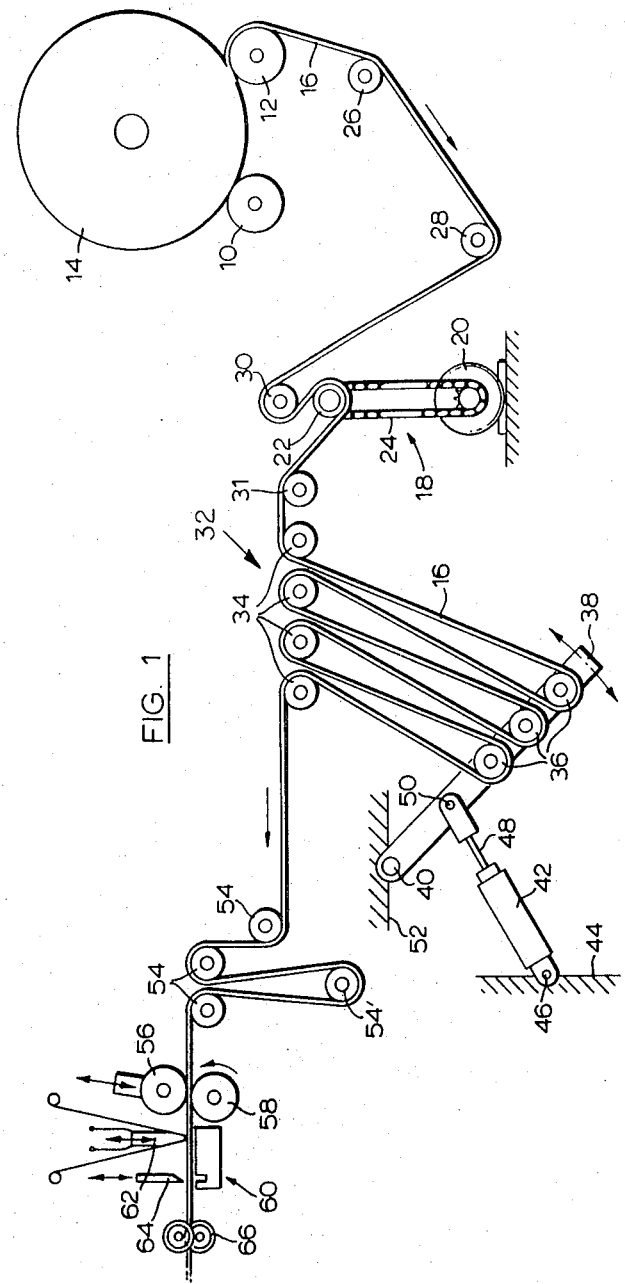
FIG. 1 is a schematic view of a bag-making apparatus showing the general arrangement of component parts.

With reference now to FIG. 1, the bag-making machine comprises a pair of surface unwind rollers 10,12 upon which a roll of feed stock 14 is seated for rotation as tubular material 16 in flattened form is drawn therefrom. Tubular stock 14 will be of a flexible, thermoplastic material having the heat sealing characteristics of polyethylene or polypropylene.

The capstan drive designated generally by numeral 18 comprises a drive motor 20 operatively connected to rubber-covered drive roller 22 by a chain 24. Capstan 18 draws feed stock 16 from roll 14 by way of idler rollers 26, 28 and 30, the latter roller arranged in conjunction with idler roller 31 relative to drive roller 22 as shown or in abutment with drive roller 22 to provide a satisfactory wrap about drive roller 22 to avoid slippage of feed stock thereon.

The compensator designated generally by numeral 32 comprises a plurality of idler rollers 34 journaled for rotation in a fixed position and a plurality of idler rollers 36 journaled for rotation on arm 38 mounted for pivotal movement by pin 40 at one end thereof. Single-acting pneumatic cylinder 42 connected at one end to support wall 44 by pivot pin 46 and having a piston and rod assembly 48 slidably mounted therein and pivotally connected at the other end to arm 38 by pivot pin 50 is adapted to bias arm 38 in a downward, clockwise position as viewed in FIG. 1 for maintaining stock 16 under tension. Air under about 10 psig pressure, for example, is introduced to cylinder 42 to maintain a constant and uniform pressure on arm 38 regardless of its position.

It will be understood that a tension spring can be used in place of pneumatic cylinder 42 to maintain a pressure on arm 38. However, a pneumatic cylinder has the advantage over a spring in that the force exerted on arm 38 will be uniform as determined by the pneumatic pressure in the cylinder whereas the pressure exerted by a tension spring will vary as the length of the spring is extended or decreased.

Operatively connected to arm 38 and not shown is a limit control well known in the art which measures the angle defined between arm 38 and a reference plane, such as, for example, between arm 38 and support wall 52. The control is operatively connected electrically to capstan drive motor 20 whereby upward, counter-clockwise movement of arm 38 will result in capstan drive 18 increasing in speed to draw an increased amount of stock from roller 14 such that arm 38 will return to its normal position as shown schematically in FIG. 1. As arm 38 reaches a predetermined angle of inclination, drive 20 slows down and/or is stopped; constant tension being maintained on stock 16 at all times by pneumatic cylinder 42.

A plurality of idler rollers 54 are located intermediate compensator 32 and draw rolls 56, 58 to permit inclusion of a perforating device in the system if desired. Idler roller 54' is adjustably mounted to facilitate incorporation of a perforating device.

A pair of draw rollers 56, 58 are located immediately before sealing bar-knife section 60; sealing bar 62 and knife 64 being adapted for vertical reciprocal movement as will become evident as the description proceeds. Stacking wheels 66 are disposed adjacent sealing-cutting assembly 60 for discharging finished bags from the machine.

Although not shown, it will be understood that the foregoing rollers are journaled for rotation and the pivot pins mounted in a rigid steel framework, not shown.

The drive assembly 67 for draw rollers 56, 58 will now be described with particular reference to FIGS. 2 and 3 of the drawings, the travel of feed stock being indicated generally by arrow 68. Draw roller 58 is driven intermittently in a counter-clockwise direction as viewed in FIG. 3 by shaft 70 having gear 72 secured at one end thereto. An electric brake 74 encircling shaft 70 for positive engagement therewith is adapted to positively stop rotation of shaft 70 and draw roller 58 during the operation of the machine, as will become evident hereinbelow. Shaft 70 is rotated by chain 76 which is driven in a counter-clockwise direction by drive gear 78 connected to electro-magnetic clutch 80. An idler gear 82 is slidably mounted on support 84 for adjustment of the tension of chain 76.

Electric motor 86 drives shaft 90 at a constant speed through chain 88 which connects the sprocket gear 94 on motor output shaft 92 to sprocket gear 96 on shaft 90. Main drive shaft 90 is rotated in a counter-clockwise direction as viewed in FIG. 3 at a speed determined by motor 86 or by a speed controller not shown interconnecting drive shaft 90 with motor 86; the latter providing variable speed control of shaft 90.

Eccentric drive 98 comprises a pivot point defined by stub shaft 100 eccentrically mounted on length adjuster assembly 104 having threaded rod 106 mounted therein for rotation to permit variation of eccentricity of shaft 100 relative to the axis of shaft 90. A counterweight 108 is secured to shaft 90 opposite length adjuster 104 to balance the weight of the said adjuster 104. A rack 110 is pivotally mounted at one end to stub shaft 100 and is slidably mounted at the opposite end for substantially reciprocal movement within housing 112. Roller bearings 114 journaled within housing 112 hold rack 110 against pinion 116 which is journaled for rotation within housing 112 as rack 110 is reciprocated. Bearings 115, mounted as shown in FIG. 3 or mounted in housing 112, provide lateral support to rack 110. Shaft 118 having pinion 116 mounted thereon is connected to the armature plate 120 of electro-magnetic clutch 80 hereinbefore referred to causing said component 120 of the clutch to rotate back and forth as shaft 118 is rotated by the rack and pinion assembly. As will be discussed in more detail hereinbelow with reference to the operation of the machine magnet component 121 of clutch 80 connected to drive sprocket 78 rotates drive sprocket 78 in a counter-clockwise direction.

With reference to FIG. 2, drive assembly 67 is housed within casing 69 and eccentric drive 98 housed within casing 71.

Turning now to FIGS. 4 and 5, the sealing-cutting components of our machine will be discussed in detail. The drive roller 56 is adjustably mounted for substantially vertical movement by pneumatic cylinder assemblies 122 having the ends of the shaft of roller 56 journaled in blocks 124. The pressure of air supplied to assembly 122 controls the pressure of abutment between draw rollers 56,58.

Rollers 56,58 have peripheral recesses 126 formed at equal intervals along the length of said rollers to receive therein a plurality of stationary fingers 128 mounted on bar 129 and plate 153 and fingers 130 mounted for pivotal movement on bar 132. Feed stock travelling between rollers 56,58 if jammed, displace fingers 130 upwards by movement of bar 132 about shaft 134 whereby said upward movement of fingers 130 causes limit switch 136 to be actuated to immediately shut down the operation of the machine as will be described. We have found that a 2 inch longitudinal spacing of grooves 126 provides optimum spacing of fingers 128, 130 to immediately detect the presence of jammed stock material at any point along the length of the drive rollers. The grooves 126 have sufficient depth to accommodate fingers 128,130.

Sealing bar 140 having resistance element 142 passing therethrough for heating of the bar to a predetermined temperature is mounted for vertical reciprocal movement onto and away from support 144 which comprises a steel or the like metal component 146, foam rubber strip 148 and hard silicon rubber contact strip 150 covered by teflon cloth, all of which are joined together by plate 153, the latter also functioning as a support for stationary fingers 128 as has been described.

Sealing bar 140 has a sheet 176 of a high temperature material such as polytetrafluoroethylene such as sold under the trademark TEFLON wrapped thereabout to obviate sticking of the bag material to the heated sealing bar during the sealing operation. A water-cooled baffle 177 is disposed intermediate sealing bar 140 and rollers 56,58 to prevent heating of said rollers due to the proximity of the rollers to the sealing bar. Knife blade 152 is likewise water-cooled to prevent heating of said blade.

The cutting edge of knife 152 is adapted to be received within slot 156 formed longitudinally along metal bar 158 which is secured to plate 152 to join sealing components 144, 148 and 150 together. Knife 152 is mounted for vertical reciprocal travel and comprises, as shown most clearly in FIG. 4, knife blade 152 rigidly secured to support bars 164 and having a segmented guard plate 166 slidably mounted on the face of blade 152 and biased downwardly by compression spring 168 for disengaging truncated stock material from knife blade 152 upon completion of the cutting stroke. Plate 166 abuts the top face of metal bar 158 on the downward travel of knife blade 152 permitting the blade only to enter recess 156.

Overlapping and staggered pairs of stacking wheels 170,172 are driven by a drive motor, not shown, to engage and corrugate the bag material as it is discharged from the machine for drawing said material from the machine and transporting said material to stacking bins, not shown. Each wheel 170,172 may have a rubber facing 174 for positive, non-slipping engagement with the bag material.

FIG. 6 illustrates the sealing bar and knife actuating and control mechanisms housed in casings 173 and 247 of FIG. 2. Knife support bars 164 are joined together by bolts 166 to grip rods 168 therebetween at each end such that vertical movement of rod 168 raises and lowers bars 164. Rod 168 is passed through sleeve-bearing 170 welded to machine side-frame 171 for guided reciprocal travel therein. The lowermost extremity of rod 168 is pivotally connected to link 172 by connector 174 and the opposite end of link 172 is pivotally connected to lever 176 by connector 178, connectors 174 and 178 being for example bolts threaded into one component part and passing through an eye 175,177 respectively formed in the other part. Lever 176 is keyed onto shaft 180 whereby reciprocal axial movement of piston-rod 182 pivotally connected thereto by connector 184 is transmitted to rod 168 for reciprocal vertical movement thereof. Double-acting cylinder 186 positively advances and retracts rod 182 as will be described in the description of the operation of the machine.

Support rods 190, 192 for teflon sheet 176 are rigidly secured at each end in support bars 194 which are secured to arms 196 adapted for pivotal movement about stub shafts 198 by the vertical reciprocal movement of rod 200 pivotally connected thereto as indicated by connector 202. The lowermost end of rod 200 is pivotally connected to lever 204 by connector 206 whereby rocking movement of lever 208 transmits motion from link 210 pivotally mounted to arm 212 which pivots about shaft 214 for transmitting eccentric motion from cam 216 mounted on drive shaft 90. Double-acting cylinder 220 having piston 221 pivotally connected to rod 223 rigidly secured to arm 212 is adapted to hold cam-follower roller 222 of arm 212 against the peripheral surface 224 of cam 216. Cam 216 is adjustable by having a pair of eccentric discs 226, 228 held together by screws or the like securing means, not shown, to vary the cam peripheral surface thereof. Pneumatic cylinder 220 also permits raising of arm 212 from engagement with cam 216 when it is desired to disengage the sealing bar while operating the remainder of the machine.

Shaft 180 having lever 176 keyed thereon passes through the width of the machine to the opposite side thereof for actuation of second rod 168. In like manner sleeve 232 having lever 204 keyed thereon is connected to a lever pivotally mounted on the opposite side of the machine for reciprocal actuation of second rod 200 and second support arm 196.

Double-acting pnuematic cylinder 239 is connected to cylinders 186 and 220 by a yoke 240 to permit retraction of the sealing bar and knife-cutting mechanism during servicing and inspection.

A control mechanism indicated generally by numeral 244 contains a shaft 246 journaled in housing 247 having supporting cam discs 248, 250, 252, 254 and 256 for controlling, respectively, the clutch and brake mechanism, counter and perforator, electric eye, cut-off and full cycle operations. Shaft 246 is connected to gear 258 which engages gear 260 keyed for rotation on drive shaft 90 for synchronization of said control cams and related limit switches with the cycling of the draw rollers, the sealing bar and the cutting mechanisms. Each of cam discs 248, 250, 252, 254 and 256 is adapted to actuate a limit switch designated by numerals 262, 264, 266, 268 and 270 respectively for energization and de-energization of the respective components, as will become evident in the description of the operation of the machine.

Figure 7:
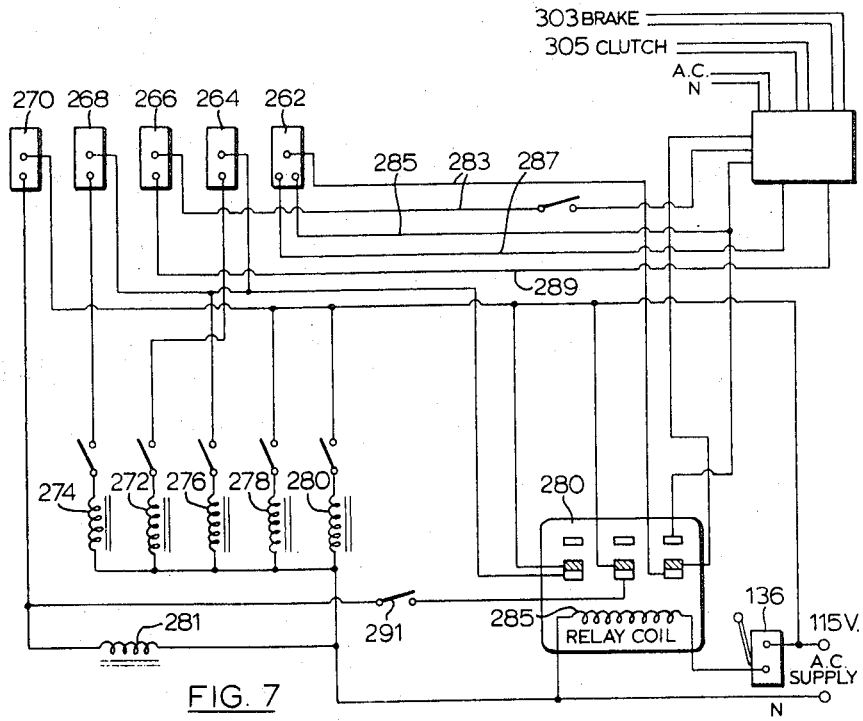
FIG. 7 is a schematic view of the electric circuits of the machine.

FIG. 7 illustrates schematically the electrical circuits of the machine. The several cam-operated limit switches are electrically communicated to the machine components as follows: switches 262,268 communicate a D.C. supply to the machine brake and clutch, switch 262 being a two-pole single-throw switch and switch 266 a single-pole single-throw switch for use with an electric-eye device not shown; switch 264 is a single-pole single-throw switch connected to solenoid 272 for actuating a counter and perforator, if desired; single-pole single-throw switch 268 is connected to cut-off solenoid 274 and to sealing bar solenoid 276; and single-pole single-throw switch 270 is connected to motor 86. Switch panel 280 with safety switch 136 are electrically connected to permit immediate shut-down of the machine.

In operation, tubular feed stock 16 is drawn from roll 14 by capstan drive 20 at a rate determined by the control connected to arm 38 of compensator 32, as is well known in the art. The stock material passes about idler rollers 54,54' and predetermined lengths of material are drawn between draw rollers 56,58 for positioning under sealing-cutting assembly 60.

Figure 8:
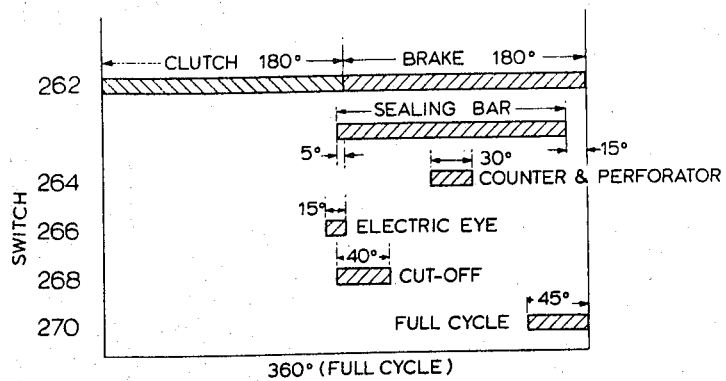
FIG. 8 is a chart illustrating the sequence of operation of the components of the machine.

With reference to FIGS. 7 and 8, switch 262 is actuated such that clutch 80 is energized for about 180° of a bag-making cycle and brake 74 is energized for the remaining 180° of said cycle, whereby the draw rollers are either being positively advanced or braked. Switch 264 is actuated each cycle to energize solenoid 272 which controls a counter device and a perforator, not shown. Switch 268 is actuated with about 5 degrees remaining of the clutch cycle whereby solenoid 274 is energized opening double-acting pneumatic valve 280 to permit air to flow to line 282 of pneumatic cylinder 186 for actuation of piston 182 through lever 176, link 172, rod 168 and transfer support bars 164 for downward movement of knife-blade 152 and severing of sheet material thereunder. Severing of the bag material at the end of the draw cycle takes place while the bag still has residual forward motion whereby discharge of the bag by stacking wheels 170 is facilitated and occurs with a continuous motion.

The sealing bar 140 is actuated by cam 216 through cam follower 222 on arm 212, link 210, lever 208 and rod 200 to arm 196 which is pivoted about bolt 198 to descend for abutment of bar 140 against back-stop 150. The sealing operation commences concurrently with actuation of switch 262 for energization of brake 74 and shortly after the cutting operation has commenced and continues for about a dwell time of about 165° which is about 15° short of the completion of the brake cycle such that the sealing bar is retracted when the brake is de-energized and the draw rolls re-engaged by energization of the clutch mechanism 80.

The sealing bar can be applied over a range of from 100° to 160° of the full cycle depending on the thickness, i.e. gauge, of material used, the nature of material used, temperature of the bar and rate of throughput, i.e. draw length of each bag made.

Upon completion of the sealing operation, cam 216 permits cam follower 222 to be lowered under the bias of a constant pressure in pneumatic cylinder 220 to raise rod 200 and arm 196. Double-acting switch 262 energizes clutch 80 whereby draw rollers 56, 58 are coupled to the drive motor for rotation and for drawing the next length of stock material therethrough for a repeat of the cutting sealing operation. It will be evident that braking of draw roller 58 occurs when the linear movement of rack 110 has substantially ceased thus resulting in little torque being applied to shaft 70.

Fingers 130 positioned at spaced intervals along idler roller 56 are pivotally mounted by rod 134 passing through bar 132 such that a jam up of stock material at any point along the length of rollers 56, 58 will result in upward, clockwise movement of fingers 130 for actuation of switch 136 which energizes relay coil 285 to de-energize clutch 80, energize brake 84, move pneumatic cylinders 186 and 220 into their neutral position causing the sealing bar and cut-off to move to an upward inoperative position and permits the main drive shaft to complete a full cycle to the beginning of the draw operation and then stop.

What we claim as new and desire to protect by Letters Patent of the United States is:

1. A sealing-cutting mechanism for use in a bag-making machine for manufacturing bags from thermoplastic material of tubular, flexible stock comprising: an elongated knife mounted for vertical reciprocal travel into and out of a mating recess; a sealing bar adapted for vertical reciprocal travel onto a support in proximity to said knife and recess; and an actuating and controlling mechanism operatively connected to said knife and sealing bar comprising a substantially horizontal knife support, a pair of spaced apart vertical rods of which a vertical rod is secured at its upper end to each end of said knife support and slidably mounted in a machine frame for vertical reciprocal travel, a crank-lever pivotally connected to the lowermost end of each vertical rod and keyed onto a common shaft journaled for rotation through the machine frame, whereby said rods are interconnected, and a hydraulic piston-cylinder operatively connected to said crank-lever, whereby said knife can be raised or lowered by actuation of said piston-cylinder; a substantially horizontal sealing bar support, an elongated arm supporting each end of said bar support pivotally mounted at one end on a machine frame, a pair of elongated rods of which an elongated rod is connected at its upper end to each free end of the elongated arm, a second crank-lever pivotally connected to the lowermost end of each elongated rod and keyed onto a common sleeve journaled for rotation through the machine frame, whereby said elongated rods are interconnected, and a cam follower operatively connected to said second crank-lever for transmitting the rotary motion of a cam to a reciprocal vertical motion of the sealing bar.

2. A sealing-cutting mechanism as claimed in claim 1, in which said sealing bar has a sheet of a material having the characteristics of polytetrafluorethylene wrapped about its sealing edge.

3. A sealing-cutting mechanism as claimed in claim 1, in which said support adapted to receive the sealing bar during its reciprocal travel comprises a rigid backing component covered by a resilient strip which is overlain by a sheet having the characteristics of polytetrafluorethylene.

* * * * *